(12) United States Patent
Yang et al.

(10) Patent No.: US 12,452,423 B2
(45) Date of Patent: Oct. 21, 2025

(54) LOW FREQUENCY NON-SEPARABLE TRANSFORM AND MULTIPLE TRANSFORM SELECTION DEADLOCK PREVENTION

(71) Applicant: Intel Corporation, Santa Clara, CA (US)

(72) Inventors: Tsung-Han Yang, Folsom, CA (US); Felix Yohan Christian, Folsom, CA (US); Ken Lo, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 17/457,643

(22) Filed: Dec. 3, 2021

(65) Prior Publication Data

US 2022/0094931 A1    Mar. 24, 2022

(51) Int. Cl.
*H04N 19/122* (2014.01)
*H04N 19/18* (2014.01)
*H04N 19/65* (2014.01)

(52) U.S. Cl.
CPC ........... *H04N 19/122* (2014.11); *H04N 19/18* (2014.11); *H04N 19/65* (2014.11)

(58) Field of Classification Search
CPC ..... H04N 19/122; H04N 19/65; H04N 19/188
See application file for complete search history.

(56) References Cited

U.S. PATENT DOCUMENTS

| 11,558,641 B2* | 1/2023 | Nam | H04N 19/593 |
| 11,575,914 B2* | 2/2023 | Koo | H04N 19/593 |
| 11,683,527 B2* | 6/2023 | Egilmez | H04N 19/61 |
| | | | 375/240.2 |
| 11,831,918 B2* | 11/2023 | Nam | H04N 19/176 |
| 11,871,035 B2* | 1/2024 | Koo | H04N 19/18 |
| 12,022,119 B2* | 6/2024 | Lim | H04N 19/11 |
| 2012/0134412 A1* | 5/2012 | Shibahara | H04N 19/91 |
| | | | 375/240.03 |
| 2012/0170649 A1* | 7/2012 | Chen | H04N 19/122 |
| | | | 375/240.18 |
| 2013/0070855 A1* | 3/2013 | Zheng | H04N 19/52 |
| | | | 375/E7.125 |
| 2018/0020218 A1* | 1/2018 | Zhao | H04N 19/124 |
| 2020/0389661 A1* | 12/2020 | Zhao | H04N 19/625 |
| 2020/0396487 A1* | 12/2020 | Nalci | H04N 19/18 |
| 2021/0076074 A1* | 3/2021 | Chang | H04N 19/96 |
| 2021/0099702 A1* | 4/2021 | Egilmez | H04N 19/61 |
| 2021/0160541 A1* | 5/2021 | Chiang | H04N 19/176 |
| 2021/0321137 A1* | 10/2021 | Egilmez | H04N 19/186 |
| 2021/0368174 A1* | 11/2021 | Zhao | H04N 19/46 |
| 2022/0038744 A1* | 2/2022 | Nam | H04N 19/12 |

(Continued)

*Primary Examiner* — Sath V Perungavoor
(74) *Attorney, Agent, or Firm* — Hanley, Flight & Zimmerman, LLC

(57) ABSTRACT

This disclosure describes low frequency non-separable transform and multiple transform selection deadlock prevention. The systems and methods may allow for types of transforms performed on the encoding side of a video encoding and decoding system to be determined prior to the transform parameters being decoded on the decoder side. This may allow for the inverse transform of some or all transform units (TU) received in a bit stream to be performed quicker, which may reduce the stress on the bit stream buffer.

20 Claims, 6 Drawing Sheets

(56) References Cited

U.S. PATENT DOCUMENTS

| | | | |
|---|---|---|---|
| 2022/0086449 A1* | 3/2022 | Koo | H04N 19/176 |
| 2022/0094931 A1* | 3/2022 | Yang | H04N 19/18 |
| 2022/0109863 A1* | 4/2022 | Zhao | H04N 19/61 |
| 2022/0109877 A1* | 4/2022 | Choi | H04N 19/186 |
| 2022/0150503 A1* | 5/2022 | Koo | H04N 19/176 |
| 2022/0217364 A1* | 7/2022 | Koo | H04N 19/60 |
| 2024/0015328 A1* | 1/2024 | Zhang | H04N 19/119 |
| 2024/0064337 A1* | 2/2024 | Koo | H04N 19/172 |
| 2024/0305794 A1* | 9/2024 | Koo | H04N 19/70 |

* cited by examiner

LOW FREQUENCY NON-SEPARABLE TRANSFORM AND MULTIPLE TRANSFORM SELECTION DEADLOCK PREVENTION

TECHNICAL FIELD

This disclosure generally relates to systems, devices, and methods for video encoding and, more particularly, to low frequency non-separable transform and multiple transform selection deadlock prevention.

BACKGROUND

Versatile Video Coding (VVC) (also known as H.266) is a video compression standard finalized in July 2020 by the Joint Video Experts Team (JVET). The standard provides guidelines for video encoding and decoding. Typically, on the decoding side, it may be necessary to determine a type of transform that was used on the encoding side in order to perform an inverse transform of any data received in a bit stream. Two example types of transforms may include Low Frequency Non-Separable Transform (LFNST) and Multiple Transform Selection (MTS). However, typically in order to determine which type of transform was used for a particular transform unit (TU), multiple stages of decoding must first be performed (coding units (CU) decoding, TU decoding, and then transform parameter decoding). This may be problematic in that all of the TUs associated with a given CU may need to be decoded before the inverse transform process can begin for one of the TUs. This may lead to a bottleneck in a bit stream buffer that houses received encoded video data.

BRIEF DESCRIPTION OF THE DRAWINGS

The detailed description is set forth with reference to the accompanying drawings. The use of the same reference numerals indicates similar or identical components or elements; however, different reference numerals may be used, as well to indicate components or elements, which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
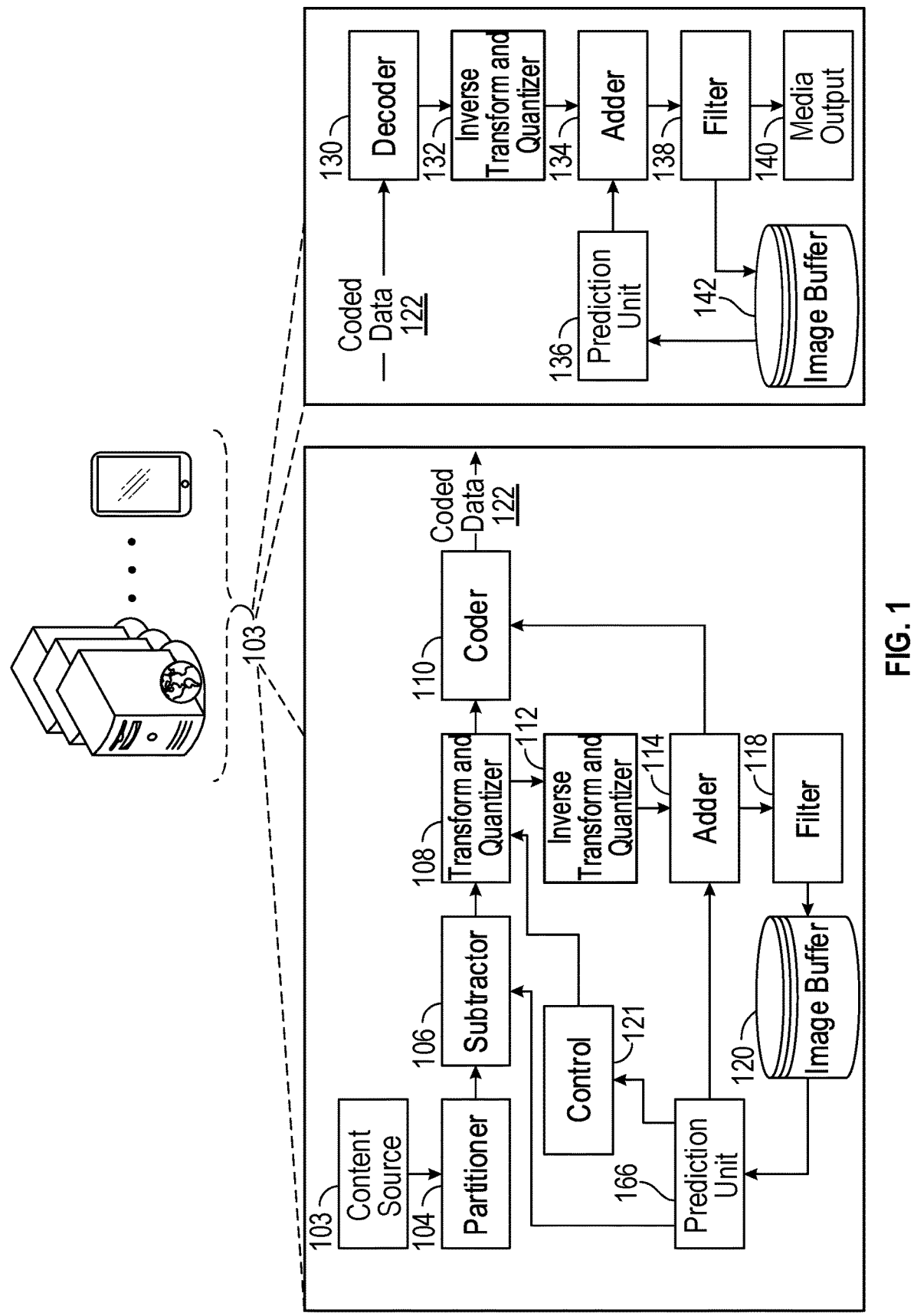
FIG. 1 illustrates an example system, in accordance with one or more embodiments of the disclosure.

This disclosure relates to improved video coding efficiency, and more specifically, predicting the presence of low frequency non-separable transform and multiple transform selection indices to improve the inverse transform process of video coding. The prediction may prevent deadlock, for example. Specifically, the systems and methods may enable the inverse transform portion of the decoding process to initiate sooner in some situations than it otherwise could initiate in order to improve decoding performance (for example, throughput and timing). This increased performance may, in turn, reduce the required amount of buffer space to start processing transform unit (TU) coefficients on the decoder side, and may mitigate or prevent "deadlock" scenarios in the buffer. Deadlock may include a scenario in which a video frame is held in the buffer until decoded, and at the same time, other frames are being received. This may lead to situations where the buffer becomes full, which may bottleneck the video stream. This deadlock may be mitigated or eliminated by performing inverse transforms of some of the TUs associated with a given video frame without requiring a context-adaptive binary arithmetic coding (cabac) engine (part of the entropy portion of the compression process as described below) to complete coefficient decoding for all of the TUs generated for the frame and without requiring decoding syntax subsequent to the TU syntax. That is, the systems and methods described herein increase the performance of the decoding process by allowing, in some situations, the cabac engine to decode any remaining TU coefficients in parallel with the inverse transform process on TUs that have already been decoded.

A typical video encoding and decoding system may include a transmitting device configured to receive source video and compress (e.g., encode) video data of the source video for transmission to a receiving device. This compressed data may be transmitted to the receiving device as a "bit stream." The receiving device may be configured to decode the compressed video data received from the transmitting device. For example, the transmitting device may be a source of video content and the receiving device may be a device on which a viewer is watching the video content (and/or the receiving device may be a third device that may decode the video and provide the decoded video content to the device on which the viewer is watching the video content). The video content at the source may be compressed to maximize video quality and throughput by allowing a video frame including a large number of pixels to be compressed into a smaller amount of data to provide for quicker transmission and processing at the receiving device.

At a high-level, the encoding process may involve at least the following operations. First, a video frame may be received in the form of a number of pixels. The video frame may be separated into different coding tree units (CTUs), a respective separated into one or more coding tree blocks (CTBs), and a respective CTB separated into one or more coding units (CU), which may include groups of pixels included in the frame and/or information associated with the pixels, such as luma and chroma information. CUs may be separated into one or more TUs—blocks of pixels. A predicted block of pixels may be generated for a TU, which may involve comparing the pixel data associated with the current frame to a reference image, which may be representative of a previously coded frame in the video content (e.g., inter-coding), and/or which may be representative of previously coded pixel data of the same frame (e.g., intra-coding). The predicted block then may be subtracted (e.g., at a subtractor) from the current block of original image data, and the resulting residual pixel values (e.g., representing the difference between the predicted block and the original image data) may be provided to a forward transform stage at which the residual pixel data included in the TU is converted into a domain of transform coefficients. There are multiple types of transforms that may be used to convert the residual pixel data to a domain of transform coefficients, and some of the transform types are discussed herein. Following the application of a transform, the transformed TU is provided to a quantizer stage. The forward transform and the quantizer stages can transform the divided residual data into transform coefficients using discrete cosine transform (DCT) for example. Using a quantization parameter (QP) set by the system, the transform and quantizer then uses lossy resampling or quantization on the coefficients. The frames and residuals along with supporting or context data block size and so forth may be entropy encoded by the coder and transmitted to the receiving device.

The systems and methods described herein may be applicable to the Versatile Video Coding (VVC) video compression standard (however, the systems and methods may also be applicable to other standards as well). The VVC standard may be associated with a number of different types of transforms. These different transforms may provide different mechanisms by which the pixel data can be transformed into another domain on the encoding side of the process (for example, at the forward transform stage of the process). Two example options of such transforms may include Low Frequency Non-Separable Transform (LFNST) and Multiple Transform Selection (MTS), among other options. That is, the LFNST and MTS may provide two different types of transforms that may dictate the frequency data that result when the initial pixel data are transformed as part of the encoding process. Depending on which transform is used, the resulting TU residual coefficients may differ. Given this, in order to convert the TU residual coefficients back to the pixel domain (e.g., color domain) at the receiving device (e.g., generating reconstructed residual pixel values), it may be necessary for the receiving device to know which type of transform was used before performing an inverse transform on the TU residual coefficients to generate the reconstructed residual pixel values.

At the receiving device, the compressed video frames may be received and decoded so that the video content may be presented to a viewer. In some cases, a typical decoding process may involve at least the following operations. First, the receiving device may receive compressed data relating to a particular frame of a video stream. The compressed data may be decoded into one or more CUs. Once the CU decoding is performed, the TU residual coefficients may be decoded from the decoded CU(s). Once all of the TU residual coefficients are decoded, any LFNST and MTS data may then be decoded. The VVC standard provides a technique for communicating to the receiving (e.g., decoding) device whether an LFNST or MTS was used for respective video frames of a bit stream. For example, one or more flags (e.g., indices) may be transmitted through the bit stream to the decoder. A flag may include a bit indicating whether the particular type of transform was used (e.g., is present). For example, if LFNST was used on the encoder side, then the flag for LFNST may be set to a value of "1." Once the LFNST and MTS data is decoded, then an inverse transform of the received video frame data may be performed to produce the original pixel information for the frame. By predicting whether a LFNST or MTS was used before actually decoding the data to identify the LFNST or MTS index, the inverse transform process may occur sooner, improving decoding efficiency.

Typically, in order to determine at the receiving device which type of transform was employed by the encoding process, all of the TU residual coefficients (e.g., of all TUs of a frame) need to be decoded first, then additional syntax may need to be decoded prior to performing the inverse transform (e.g., additional syntax indicating which transform was used by the encoder). After all of the TU residual coefficients are decoded, then additional syntax data that includes the transform data may be decoded to decipher which transform type(s) were employed. Once this is accomplished, the inverse transform may be performed on the TU residual coefficients to obtain the raw pixel data. This process of waiting until all of the TU residual coefficients are decoded before decoding LFNST and MST data may be problematic in that it may bottleneck the decoding process. Another downside of waiting for all of the TU residual coefficients to be decoded may include a bit stream buffer deadlock scenario in which at least one frame is held in the buffer while while being decoded, and at the same time, other frames are being received at the buffer. This may lead to situations where the buffer becomes full.

To mitigate or eliminate this type of deadlock in the bit stream buffer, the systems and methods described herein may involve predicting the type of transform that was employed on the encoder side before all of the TU residual coefficients are decoded on the decoder side. This may allow an inverse transform to be performed on some of the TUs while other TUs are decoded, rather than waiting for all of the TUs and additional syntax are decoded to begin performing an inverse transform on any of the TUs.

In some embodiments, the prediction may also include multiple prediction stages that may be performed at different portions of the decoding process. For example, a first prediction stage may occur at the CU decoding stage (e.g., the inverse transform of a TU may begin prior to decoding the transform coefficients of all TUs of a CU), and a second prediction stage may occur during the TU residual coefficient decoding stage. That is, the first prediction stage may take place before the transform coefficients of each TU of a CU are decoded, and the second prediction stage may take place during and/or after decoding of the transform coefficients of each TU of a CU. In this manner, the prediction allows for determining the transform coefficients to use in the inverse transform without having to decode them. The prediction at the CU decoding stage may allow for early identification of which transform was used before the TU decoding process begins. However, if the system is unable to identify the requisite conditions for identifying a transform type during the CU decoding stage, then the second prediction stage may serve as a backup to the first prediction stage. That is, although the second prediction stage takes place at the TU coefficient decoding stage, the second prediction stage still provides benefits in that the inverse transformation process for some of the TUs can be performed before all of the TUs are decoded. An illustration of these multiple prediction stages and where they may occur in the decoding process is provided in FIG. X.

In other words, the first stage prediction conditions are checked once per TU before the start of the first TU process (e.g., decoding the TU) on a current CU, and second stage prediction conditions are checked during the process of decoding each TU inside of a CU. Immediately after the conditions in the first prediction stage or the second prediction stage are detected, a bypass signal is sent to inverse transform unit to start processing with a LNFST and MTS idx (e.g., flag) of 0, eliminating the wait time prior to initiating an inverse transform unit for the remaining TU coefficients.

In some embodiments, the requisite conditions for determining that a TU underwent a transformation using LFNST during the first prediction stage may include the following. First, treeType is not DUAL_TREE_CHROMA. Second, IntraMipFlag[x0][y0] is TRUE. Third, either lfnstWidth or lfnstHeight is smaller than 16. In some cases, multiple or all of the conditions may be required to be met in order to make this determination. Some or all of the conditions may be required to be met in order to determine a TU underwent a transformation using LFNST and MTS (or neither of the two). In some cases, all of the conditions may be required to be met. That is, if one of the conditions is met, but a second condition is not, then there may be insufficient information to determine if LFNST or MTS was used. The variables for these conditions are defined by the VVC coding standard and are described further herein.

In some embodiments, the requisite conditions for determining that a TU underwent a transformation using MTS during the first prediction stage may include the following. In some embodiments, the conditions for determining that a MTS transform was used may include some or all of the following. First, treeType is DUAL_TREE_CHROMA. Second, either cbWidth or cbHeight is greater than 32. Third, IntraSubPartitionsSplitType is not ISP_NO_SPLIT. Fourth, cu_sbt_flag is TRUE. In terms of the variables mentioned above, cu_sbt_flag equal to 1 specifies that for the current coding unit, subblock transform is used. cu_sbt_flag equal to 0 specifies that for the current coding unit, subblock transform is not used. Some or all of the conditions may be required to be met in order to determine a TU underwent a transformation using LFNST and MTS (or neither of the two). In some cases, all of the conditions may be required to be met. That is, if one of the conditions is met, but a second condition is not, then there may be insufficient information to determine if LFNST or MTS was used. The variables for these conditions are defined by the VVC coding standard and are described further herein.

In some embodiments, the requisite conditions for determining that a TU underwent a transformation using LFNST and MTS (or neither of the two) during the second prediction stage may involve at least the following. First, LFNST may only be application in intra only mode. Second, the coding block (CB) size must be less than or equal to 64×64. Third, there must be a maximum number of six TUs (for example, four luma and two chroma), and each TU must have less than or equal to 16 coefficients. Finally, a first flag of the TU ("tu_coded_flag") must be set to a value of "1" and a second flag of the TU ("transform_skip_flag") must be set to a value of "0." If all of these conditions are met, then it may be determined that LFNST was used for the TU being decoded. Some or all of the conditions may be required to be met in order to determine a TU underwent a transformation using LFNST and MTS (or neither of the two). In some cases, all of the conditions may be required to be met. That is, if one of the conditions is met, but a second condition is not, then there may be insufficient information to determine if LFNST or MTS was used. Likewise, the following conditions may need to be met to determine that MTS was used. First, the CB size must be less than or equal to 32×32. Second, there must be at most three TUs (one luma and two chroma). Third, at most, there may be 16×16 coefficients per TU, with a maximum of 768 coefficients total. The variables for these conditions are defined by the VVC coding standard and are described further herein.

Figure 3A:
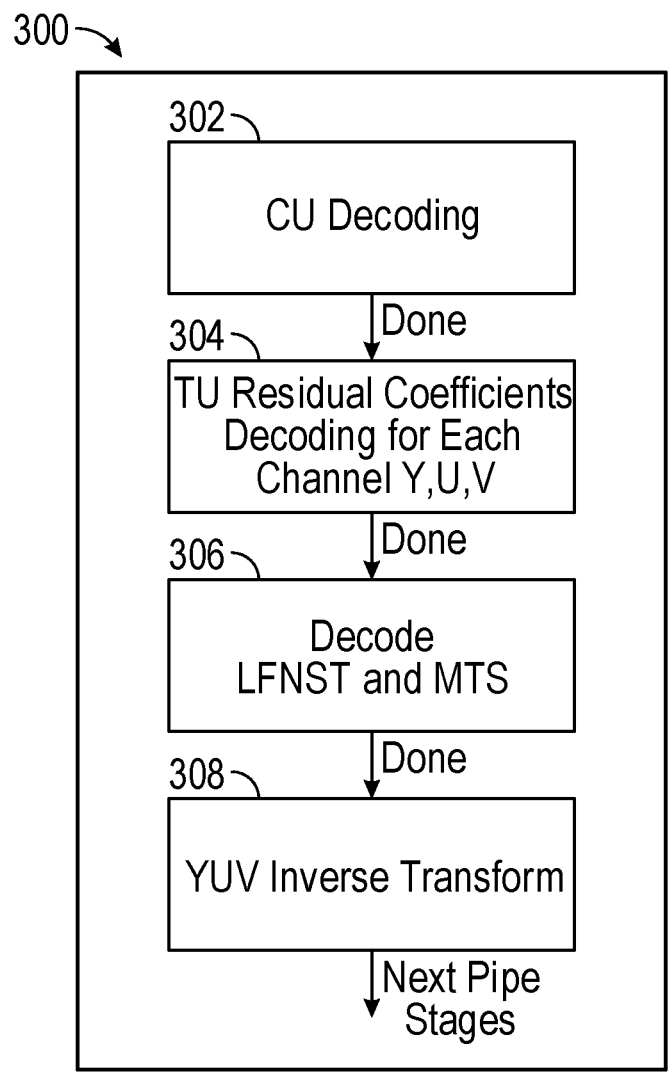
FIG. 3A illustrates an example flow diagram, in accordance with one or more embodiments of the disclosure.
Figure 3B:
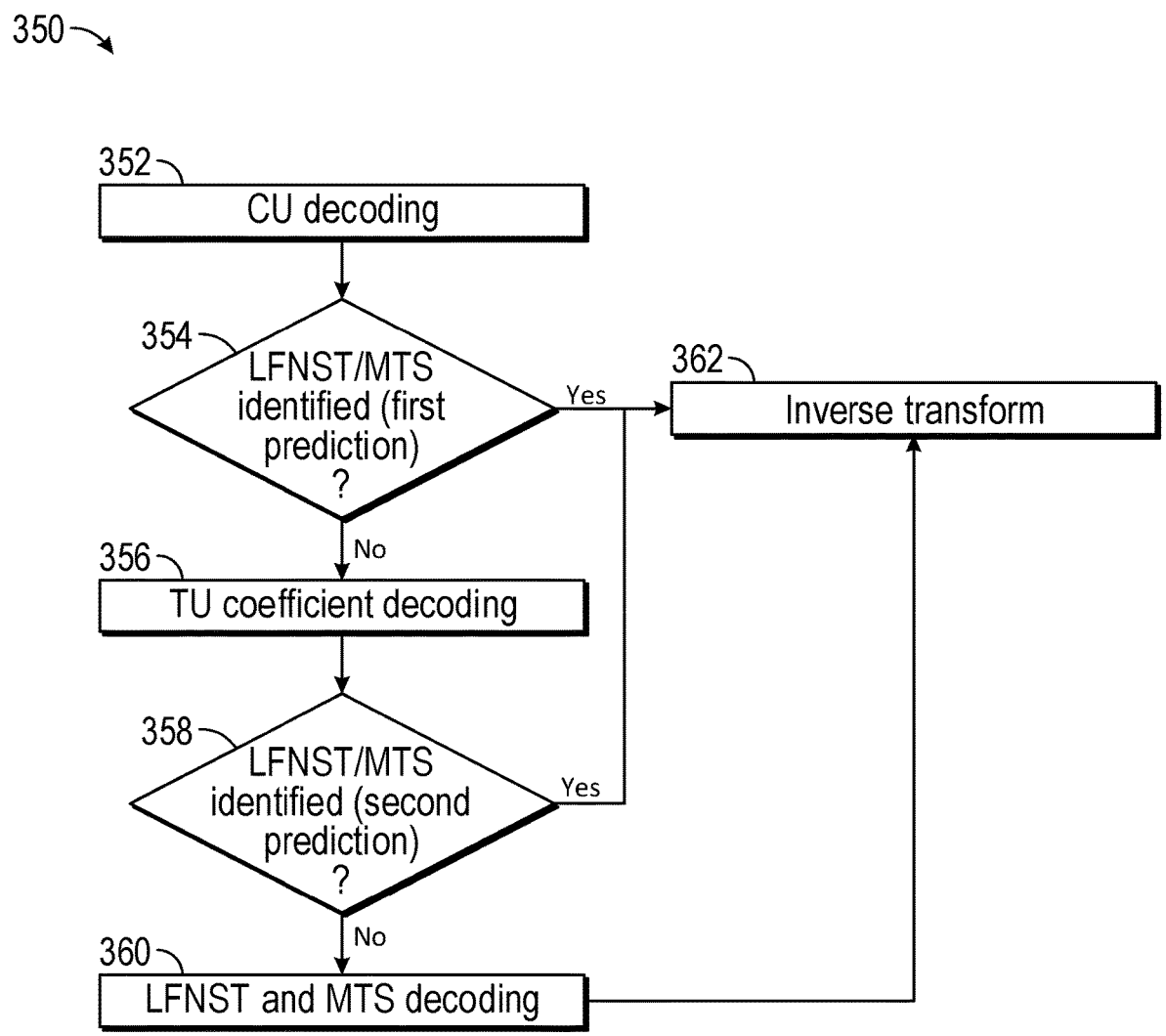
FIG. 3B illustrates an example flow diagram, in accordance with one or more embodiments of the disclosure.

Additional details about any of the conditions involved with the first and/or second prediction stages may be described in additional detail with respect to FIG. 3B.

FIG. 1 is an example system 100 illustrating components of encoding and decoding devices, according to some example embodiments of the present disclosure.

Referring to FIG. 1, the system 100 may include devices 102 having encoder and/or decoder components. As shown, the devices 102 may include a content source 103 that provides video and/or audio content (e.g., a camera or other image capture device, stored images/video, etc.). The content source 103 may provide media (e.g., video and/or audio) to a partitioner 104, which may prepare frames of the content for encoding. A subtractor 106 may generate a residual as explained further herein. A transform and quantizer 108 may generate and quantize transform units to facilitate encoding by a coder 110 (e.g., entropy coder). Transform and quantized data may be inversely transformed and inversely quantized by an inverse transform and quantizer 112. An adder 114 may compare the inversely transformed and inversely quantized data to a prediction block generated by a prediction unit 116, resulting in reconstructed frames. A filter 118 (e.g., in-loop filter) may revise the reconstructed frames from the adder 114, and may store the reconstructed frames in an image buffer 120 for use by the prediction unit 116. A control 121 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 116. Using the encoding aspects, the transform and quantizer 108 may generate and quantize transform units to facilitate encoding by the coder 110, which may generate coded data 122 that may be transmitted (e.g., an encoded bitstream).

Still referring to FIG. 1, the devices 102 may receive coded data (e.g., the coded data 122) in a bitstream, and a decoder 130 may decode the coded data, extracting quantized residual coefficients and context data. An inverse transform and quantizer 132 may reconstruct pixel data based on the quantized residual coefficients and context data. An adder 134 may add the residual pixel data to a predicted block generated by a prediction unit 136. A filter 138 may filter the resulting data from the adder 134. The filtered data may be output by a media output 140, and also may be stored as reconstructed frames in an image buffer 142 for use by the prediction unit 136.

Referring to FIG. 1, the system 100 performs the methods of intra prediction disclosed herein, and is arranged to perform at least one or more of the implementations described herein including intra block copying. In various implementations, the system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 100 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 100 and/or other systems, schemes or processes may be described herein, the present disclosure is not necessarily always limited to any particular video coding standard or specification or extensions thereof except for IBC prediction mode operations where mentioned herein.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 100 may be an encoder where current video information in the form of data related to a sequence of video frames may be received to be compressed. By one form, a video sequence (e.g., from the content source 103) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 104 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 100 may receive an input frame from the content source 103. The input frames may be frames sufficiently pre-processed for encoding.

The system 100 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 108 may be provided to the inverse transform and quantizer 112 to generate the same reference or reconstructed blocks, frames, or other units as would be generated at a decoder such as decoder 130. Thus, the prediction unit 116 may use the inverse transform and quantizer 112, adder 114, and filter 118 to reconstruct the frames.

The prediction unit 116 may perform inter-prediction including motion estimation and motion compensation, intra-prediction according to the description herein, and/or a combined inter-intra prediction. The prediction unit 116 may select the best prediction mode (including intra-modes) for a particular block, typically based on bit-cost and other factors. The prediction unit 116 may select an intra-prediction and/or inter-prediction mode when multiple such modes of each may be available. The prediction output of the prediction unit 116 in the form of a prediction block may be provided both to the subtractor 106 to generate a residual, and in the decoding loop to the adder 114 to add the prediction to the reconstructed residual from the inverse transform to reconstruct a frame.

The partitioner 104 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 116 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 116 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 116 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 106 from the current block of original image data, and the resulting residual may be partitioned into one or more transform blocks (TUs) so that the transform and quantizer 108 can transform the divided residual data into transform coefficients using discrete cosine transform (DCT) for example. Using the quantization parameter (QP) set by the system 100, the transform and quantizer 108 then uses lossy resampling or quantization on the coefficients. The frames and residuals along with supporting or context data block size and intra displacement vectors and so forth may be entropy encoded by the coder 110 and transmitted to decoders.

In one or more embodiments, a system 100 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 100 may process the bitstream with an entropy decoder 130 to extract the quantized residual coefficients as well as the context data. The system 100 then may use the inverse transform and quantizer 132 to reconstruct the residual pixel data.

The system 100 then may use an adder 134 (along with assemblers not shown) to add the residual to a predicted block. The system 100 also may decode the resulting data using a decoding technique employed depending on the coding mode indicated in syntax of the bitstream, and either a first path including a prediction unit 136 or a second path that includes a filter 138. The prediction unit 136 performs intra-prediction by using reference block sizes and the intra displacement or motion vectors extracted from the bitstream, and previously established at the encoder. The prediction unit 136 may utilize reconstructed frames as well as inter-prediction motion vectors from the bit stream to reconstruct a predicted block. The prediction unit 136 may set the correct prediction mode for each block, where the prediction mode may be extracted and decompressed from the compressed bit stream.

In one or more embodiments, the coded data 122 may include both video and audio data. In this manner, the system 100 may encode and decode both audio and video.

Figure 2A:
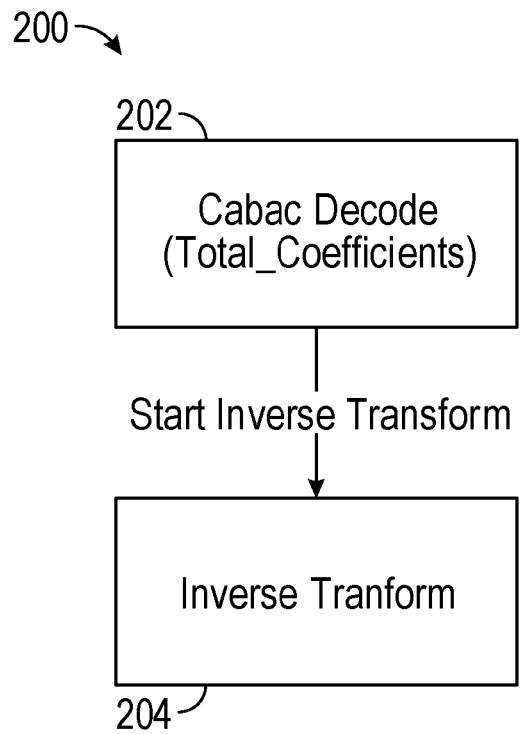
FIG. 2A illustrates an example flow diagram, in accordance with one or more embodiments of the disclosure.
Figure 2B:
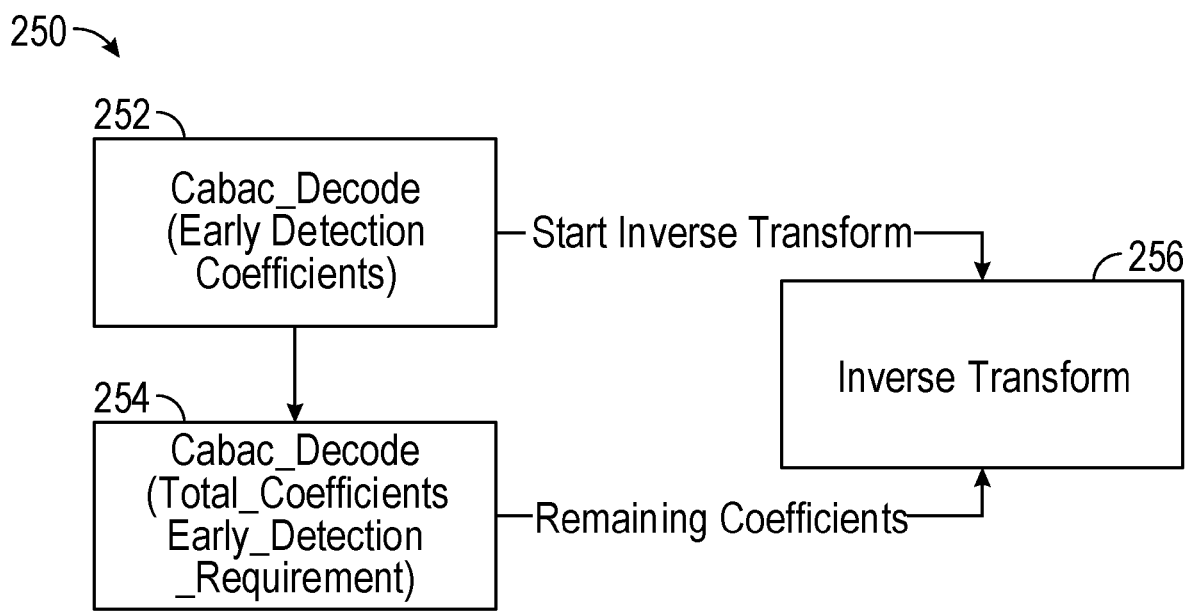
FIG. 2B illustrates an example flow diagram, in accordance with one or more embodiments of the disclosure.

FIGS. 2A-2B illustrate example flow diagrams, in accordance with one or more embodiments of the disclosure. FIGS. 2A and 2B provide a high-level depiction of the benefits provided by the systems and methods described herein. Particularly, FIG. 2A illustrates a first approach that may be taken on the decoder side, and FIG. 2B illustrates a second approach that may be taken on the decoder side, where the second approach may be representative of the improved approach described herein.

Beginning with FIG. 2A, the flow diagram 200 may illustrate that in order for an inverse transform (for example, as shown in operation 202) to be performed for a given CU, the CU, as well as all of the TUs of the CU, and additional syntax subsequent to the TU data (e.g., the transform coefficients for the TU) may need to be decoded before the inverse transform is performed for the TUs of the CU (for example, as shown in operation 204). Once all of the TUs are decoded, then additional syntax such as the transform parameters associated with those TUs (for example, lfnst_idx and mts_idx as defined in the H.266 standard) can be decoded in order to determine which transform was used for individual TUs within the CU. Once it is determined which transform or transforms were used for the individual TUs, then the inverse transform can be performed on the TUs. In this manner, performance of the inverse transform may require decoding CU data, TU data, and additional syntax to identify the transform coefficients and transforms to use in the inverse transform process. This approach may have downsides, however, in that "deadlock" scenarios in a buffer that holds the bit stream data that is being decoded in operation 202. Deadlock may include a scenario in a buffer in which received video frames are held are not decoded quickly enough to allow for more incoming video frames of a bit stream to be stored. This may lead to situations where the buffer becomes full and unable to store additional frames of a bit stream, which may bottleneck the video stream.

Turning to FIG. 2B, the flow diagram 250 may represent a second approach in which an inverse transform may be performed on some of the TUs of a CU before the remaining TUs of the CU are decoded, rather than waiting for all of the TUs of the CU plus additional syntax to be decoded (that is, before the values of lfnst_idx and mts_idx are determined) before performing the inverse transform. That is, it may be possible to predict the type of transform that was used on the encoder side for a given CU or TUs included within the CU without having to completely decode all TUs of a CU plus the additional syntax on the decoder side (depicted in the figure). In some cases, the prediction may be performed after performing CU decoding before any individual TUs within the CU are decoded (the "first prediction stage" as described herein). However, even if the CU data in the first prediction stage is lacks sufficient data to predict the type of transform, predictions may be performed as each individual TU is decoded as well (the "second prediction stage"), as illustrated in FIG. 2B. In this manner, both the first and second prediction stages may avoid the need to decode syntax subsequent to the TUs and may avoid the need to decode the syntax of all TUs. For example, if a CU comprises three TUs, then it may be possible for the type of transform for the first TU to be predicted after decoding that first TU, prior to decoding the second and third TUs, and prior to decoding the subsequent syntax after the TU syntax. In this case, the TU may proceed to the inverse transform (operation 256) before the other two TUs are decoded, and before the additional post-TU syntax is decoded. This allows for faster processing of TUs (some TUs may proceed through the inverse transform while others are being decoded). This approach illustrated in FIG. 2B is described in additional detail with respect to FIG. 3B.

FIGS. 3A-3B illustrate example flow diagrams, in accordance with one or more embodiments of the disclosure. FIGS. 3A-3B may provide a more detailed illustration of the comparison presented in FIGS. 2A and 2B.

Beginning with FIG. 3A, the flow diagram 300 begins with operation 302, in which a device (e.g., or system, such as the graphics card 565 of FIG. 5) may perform CU-level decoding of received video data (e.g., decoding of CU syntax, such as an LFNST width, an LFNST height, an LFNST enabled flag, a intra or inter coding mode, etc.). In particular, the coded video frame may have been partitioned prior to encoding (e.g., using the partitioner 104 of FIG. 1) into CUs, any CU including a number of TUs. Additionally, following operation 302, the flow diagram 300 proceeds to operation 304, in which the device may decode any TUs of the decoded CU. The TUs may be generated for the encoder by applying a transform unit (e.g., a matrix of residual coefficients) to be encoded. The decoding process may involve decoding the coded data (e.g., coding block size, number of transform coefficients, a transform skip flag, etc.), and extracting quantized residual coefficients and context data (for example, similar to the decoder 130 illustrated in FIG. 1). That is, on the encoder side, an entropy coder (for example, similar to coder 110) may generate coded data that may be transmitted (e.g., an encoded bit stream). The data may be coded on the encoder side to compress the data for transmission to minimize the amount of data that is transmitted through the bit stream. Given this, the data will then need to be decoded once the data is received from the bit stream.

Following operation 304, the flow diagram 300 proceeds to operation 306, in which the device may decode transform parameters for the decoded TUs (e.g., additional syntax subsequent to the TU-level syntax of operation 304), the transform parameters including indications of whether LFNST or MTS transforms were used for respective TUs. In this manner, all of the TUs may be decoded at operation 304 prior to decoding the transform parameters at operation 306. This decoding process may involve decoding data that may provide an indication of a type of transform that was used on the encoder side of the system. For example, as mentioned herein, the VVC standard (H.266 or others) employs several different types of transforms that may be employed. Each different type of transform may produce different resulting data, so it is important for the decoder side to know which transform was used in order to perform the inverse transform to produce the original data. Examples of such types of transforms include LFNST and MTS, among others. Once this data is decoded, then the system may obtain knowledge of which transform was used for a given TU, and then may be capable of performing an inverse transform on that TU. Individual TUs may have been transformed using different types of transforms on the encoder side, so it is not necessarily sufficient to just decode transform parameters for one individual TU in order to determine the type of transform used for the other TUs. Specifically, the H.266 standard defines the variables lfnst_idx and mts_idx. These variables being set to particular values may ultimately indicate which type of transform was used (if either of LFNST or MTS were used).

Following operation 306, the flow diagram 300 proceeds to operation 308, in which the device performs the inverse transform for all of the decoded TUs (e.g., applying the transform and residual coefficients to the decoded data). As illustrated through this flow diagram 300, this approach may have the downside of all of the TUs associated with a CU (or multiple CUs) and the additional TU transform parameter syntax needing to be decoded before the lfnst_idx and mts_idx values may be determined, as the inverse transform cannot complete without identifying the coefficients and the transforms to apply. This may result in a bottleneck in the bit stream buffer as the entire CU and TU decoding process may need to be completed for a given set of data before an inverse transform on the data can be performed and additional data in the buffer can begin the decoding process. The approach illustrated in FIG. 3B solves some of these problems with the approach taken in FIG. 3A, and is described in more detail below.

Turning to FIG. 3B, the flow diagram 350 begins with operation 352, in which a device (e.g., the graphics card 565 of FIG. 5) may perform the same or a similar CU decoding process described with respect to operation 302 of FIG. 3A. Following operation 352, the flow diagram 350 proceeds to condition 354. Condition 354 may include the first prediction stage as described herein. That is, in some cases, it may be possible for the device to predict a type of transform that was used for one or more TUs included within a decoded CU without having to decode the TUs within the CU.

In some embodiments, to predict a type of transform used for one or more TUs included within a decoded CU without needing to decode all TUs and then decode the transform parameter syntax, one or more conditions may need to be satisfied based on the decoded CU data. The conditions may differ based on the type of transform. That is, the conditions for LFNST may differ from the conditions for MTS, which may differ from the conditions for any other type of transform. For example, LFNST may need to satisfy some or all of the following general requirements. First, LFNST may only be used with intra-prediction (rather than inter-prediction) mode is used by the encoder. Second, a CU size must be smaller than or equal to 64×64. Third, a CU can have, at most, six transform units (for example, four luma and two chroma). Fourth, each transform unit must have less or equal to 16 coefficients. That is, a CU may only store 96 coefficients at most. Likewise, MTS may generally be predicted to have been used because MTS may need to satisfy some or all of the following general requirements. Luma only. Not valid in intra sub-partitions (ISP) coding mode. MTS can be enabled in subblock-based temporal mode (SBT). Fourth, a CU size must be smaller or equal to 32×32. Fifth, a CU can have, at most, three transform units (for example, one luma and two chroma). Sixth, each TU can have at most 16×16 coefficients. That is, a CU may only store 768 coefficients at most. More specific details about how such conditions may be employed to predict the usage of LFNST and MTS are described below. Some or all of the variables mentioned below may be defined in the H.266 standard produced by the International Telecommunication Union (ITU).

In some embodiments, the conditions for determining that a LFNST transform was used may include one or more of the following. First, treeType (e.g., specifying whether a single or dual tree is used to partition a coding tree node) is not DUAL_TREE_CHROMA. Second, IntraMipFlag[x0][y0] (e.g., a flag indicating whether matrix intra prediction-based image coding is used) is TRUE. Third, either lfnstWidth or lfnstHeight (e.g., the width or height of the LFNST transform) is smaller than 16. In some cases, multiple or all of the conditions may be required to be met in order to make this determination.

Likewise, if some or all of the following conditions are met, then it may not be possible to determine in the first prediction stage if LFNST was used. In such cases, the second prediction stage described below may be used to attempt to determine the type of transform as well. First, a value of either lfnstWidth or lfnstHeight is smaller than four (details regarding how to determine lfnstWidth and lfnstHeight are provided below). Second, sps_lfnst_enabled_flag is FALSE (e.g., a flag indicating whether the LFNST_idx may be present, and the flag may be identified in intra coding unit syntax). Third, CuPredMode[chType][x0][y0] is not MODE_INTRA (e.g., not intra coding mode). Finally, either lfnstWidth or lfnstHeight is greater than MaxTbSizeY. In some cases, multiple or all of the conditions may be required to be met in order to make this determination. In terms of the variables mentioned above, sps_lfnst_enabled_flag may be a flag including a bit. The bit equal to 1 specifies that lfnst_idx could be present in intra coding unit syntax sps_lfnst_enabled_flag equal to 0 specifies that lfnst_idx is not present in intra coding unit syntax. MODE_INTRA specifies whether intra or inter prediction was used. As aforementioned, these and other variables described herein may also be defined in the H.266 standard (or other VVC standards).

The parameter lfnstWidth may be derived based on the following. When treeType is DUAL_TREE_CHROMA, lfnstWidth is set equal to cbWidth/SubWidthC. When IntraSubPartitionsSplitType is equal to ISP_VER_SPLIT, lfnstWidth is set equal to cbWidth/NumIntraSubPartitions. Otherwise, lfnstWidth is set equal to cbWidth. The variable treeType may specify whether a single tree (SINGLE_TREE) or a dual tree (DUAL_TREE_CHROMA) was used to partition a coding tree node. cbWidth may represent the width of a given coding block. SubWidthC depends on the chroma format sampling structure that is used, and is defined in H.266. IntraSubPartitionsSplitType specifies whether the intra subpartitions split type is horizontal or vertical.

Additionally, the parameter lfnstHeight may be derived based on the following. When treeType is DUAL_TREE_CHROMA, lfnstHeight is set equal to cbHeight/SubHeightC. When IntraSubPartitionsSplitType is equal to ISP_HOR_SPLIT, lfnstHeight is set equal to cbHeight/NumIntraSubPartitions. Otherwise, lfnstHeight is set equal to cbHeight.

In some embodiments, the conditions for determining that a MTS transform was used may include some or all of the following. First, treeType is DUAL_TREE_CHROMA. Second, either cbWidth or cbHeight is greater than 32. Third, IntraSubPartitionsSplitType is not ISP_NO_SPLIT. Fourth, cu_sbt_flag is TRUE. In terms of the variables mentioned above, cu_sbt_flag equal to 1 specifies that for the current coding unit, subblock transform is used. cu_sbt_flag equal to 0 specifies that for the current coding unit, subblock transform is not used.

Following condition 354, the flow diagram 350 may either proceed to operation 356 or operation 362 depending on if it is determined which transform type was used for the TUs in the CU. If the type of transformation was predicted using the decoded CU data, then the flow diagram 350 may proceed to operation 362, and the inverse transform may be performed by the device for the TUs of the CU, resulting in generation of reconstructed residual pixel values (e.g., generated by the transform and quantizer 108 of FIG. 1). However, if the type of transform is not able to be predicted using the decoded CU data, then the flow diagram 350 may proceed to operation 356. Operation 356 may involve the device decoding individual TUs included within the CU that was decoded in operation 352. In some embodiments, the operation 356 may be the same as, or similar to, the TU decoding performed in association with operation 304 of FIG. 3A. That is, if the type of transform is not able to be determined using only decoded CU data, then individual TUs may proceed through the decoding process.

Following operation 356, the flow diagram 350 proceeds to condition 358. Condition 358 may include the device performing the second prediction stage as described herein. That is, even if the type of transform was not ascertainable following operation 352 (CU decoding), in some cases, it may still be possible to determine the type of transform used for individual TUs. That is, as individual TUs are decoded, it may be possible to predict the type of transform used for that particular TU before the remaining TUs are decoded. This still provides added benefit over the logic described in FIG. 3A because the inverse transform (for example, operation 362) may then be performed for some of the TUs before all of the TUs have been decoded, rather than waiting for all of the TUs to be decoded before decoding the transform parameters (for example, lfnst_idx and mts_idx) prior to the inverse transform.

In some embodiments, the conditions in the second prediction stage for determining that a LFNST transform was used may include some or all of the following (some or all of these conditions may be required to be met to predict that LFNST transform was used for a given TU). First, only intra prediction may have been used. Second, a CU may, at most, be a size of 64×64. Third, a CU may have a maximum of six TUs (4 luma, 2 chroma), and each TU with less than or equal to 16 coefficients. Fourth, per TU component coded flag tu_coded_flag=1 and transform_skip_flag=0 for a TU. transform_skip_flag[x0][y0][cIdx] specifies whether a transform is applied to the associated transform block or not. The array indices x0, y0 specify the location (x0, y0) of the top-left luma sample of the considered transform block relative to the top-left luma sample of the picture. The array index cIdx specifies an indicator for the color component; it is equal to 0 for Y, 1 for Cb, and 2 for Cr. transform_skip_flag[x0][y0][cIdx] equal to 1 specifies that no transform is applied to the associated transform block. transform_skip_flag[x0][y0][cIdx] equal to 0 specifies that the decision whether transform is applied to the associated transform block or not depends on other syntax elements.

In some embodiments, the conditions in the second prediction stage for determining that a MTS transform was used may include some or all of the following (some or all of these conditions may be required to be met to predict that MTS transform was used for a given TU). First, a CU may only have a maximum size of 32×32. Second, a maximum of three TUs (1 luma and 2 chroma) may be included in a CU. Third, at most 16×16 coefficient may be included per TU, making the worst case 768 coefficients total.

If the transform type for a particular TU is not ascertainable using the second prediction stage as described in association with condition 358, then the transform parameters subsequent to the TU syntax may still need to be decoded, and the flow diagram 350 may proceed to operation 360. The result of operation 360 may be the values of lfnst_idx and mts_idx, which may confirm whether LFNST or MTS (or neither) was used. However, if the second prediction stage is able to determine a transform type for a given TU, then the flow diagram 350 (for that particular TU) may bypass operation 360 and proceed to the inverse transform at operation 362. At that time, the LFNST and MTS decoding may be performed in operation 360, and the remaining TUs may then proceed to operation 362 and the inverse transform. The ability to perform an inverse transform on some TUs before all of the TUs have been decoded may be further illustrated in FIG. 3B (described below) as well.

Figure 4:
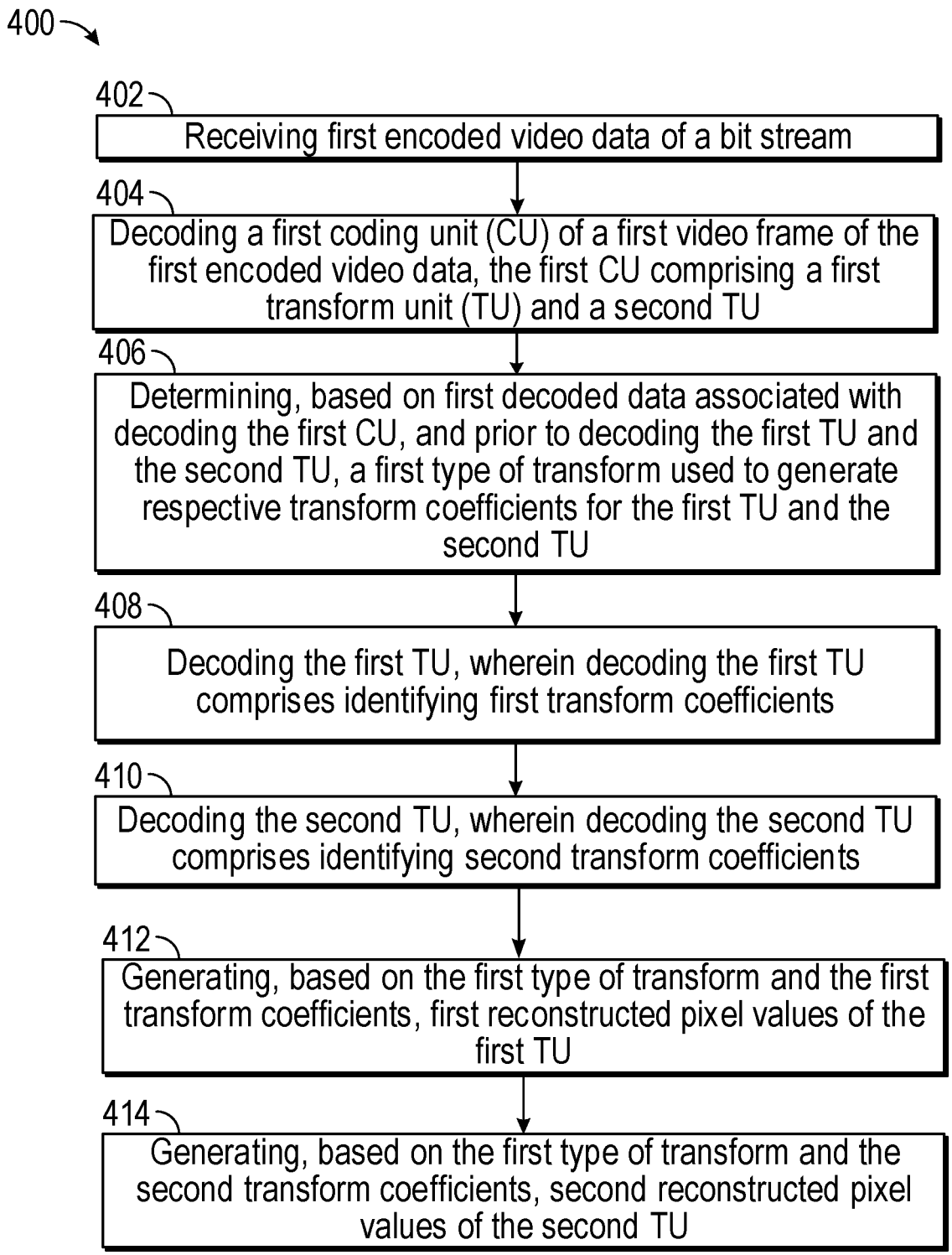
FIG. 4 illustrates an example method, in accordance with one or more embodiments of this disclosure.

FIG. 4 illustrates an example method 400, in accordance with one or more embodiments of this disclosure. The method 400 may begin with block 402, which may include a device (e.g., the graphics card 565 of FIG. 5) receiving first encoded video data of a bit stream. Block 404 of the method 400 may include the device decoding a first coding unit (CU) of a first video frame of the first encoded video data, the first CU comprising a first transform unit (TU) and a second TU. When the Block 406 of the method 400 may include the device determining, based on first decoded data associated with decoding the first CU, and prior to decoding the first TU and the second TU, a first type of transform used to generate respective transform coefficients for the first TU and the second TU. Block 408 of the method 400 may include the device decoding the first TU, wherein decoding the first TU comprises identifying first transform coefficients. Block 410 of the method 400 may include the decoding the second TU, wherein decoding the second TU comprises identifying second transform coefficients. Block 412 of the method 400 may include generating, based on the first type of transform and the first transform coefficients, first reconstructed pixel values of the first TU. Block 414 of the method 400 may include generating, based on the first type of transform and the second transform coefficients, second reconstructed pixel values of the second TU.

Figure 5:
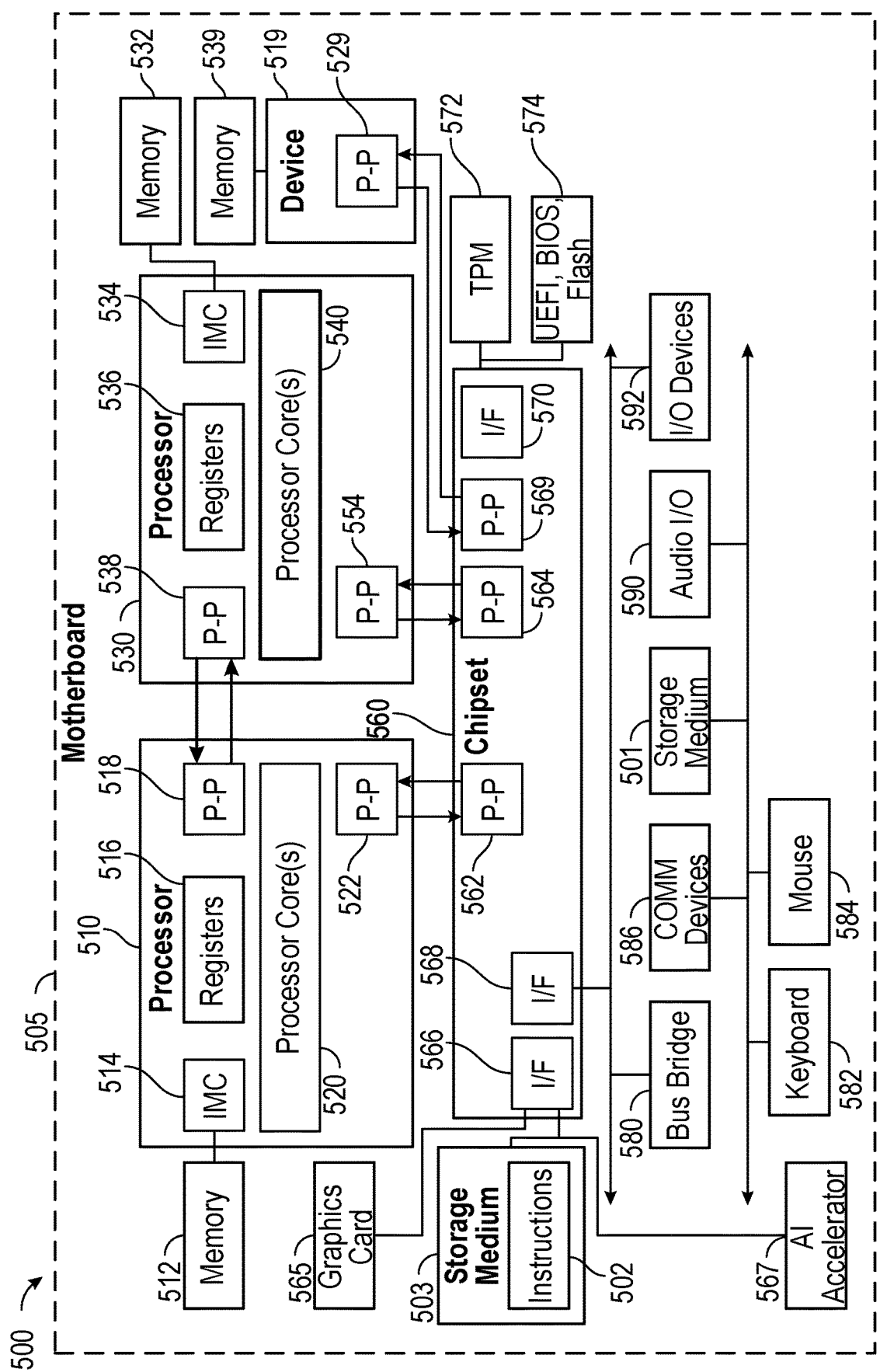
FIG. 5 illustrates an example of a computing system, in accordance with one or more embodiments of this disclosure.

FIG. 5 illustrates an embodiment of an exemplary system 500, in accordance with one or more example embodiments of the present disclosure.

In various embodiments, the system 500 may comprise or be implemented as part of an electronic device.

In some embodiments, the system 500 may be representative, for example, of a computer system that implements one or more components of FIG. 1.

The embodiments are not limited in this context. More generally, the system 500 is configured to implement all logic, systems, processes, logic flows, methods, equations, apparatuses, and functionality described herein and with reference to the figures.

The system 500 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other devices for processing, displaying, or transmitting information. Similar embodiments may comprise, e.g., entertainment devices such as a portable music player or a portable video player, a smartphone or other cellular phones, a telephone, a digital video camera, a digital still camera, an external storage device, or the like. Further embodiments implement larger-scale server configurations. In other embodiments, the system 500 may have a single processor with one core or more than one processor. Note that the term "processor" refers to a processor with a single core or a processor package with multiple processor cores.

In at least one embodiment, the computing system 500 is representative of one or more components of FIG. 1. More generally, the computing system 500 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 500. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 500 comprises a motherboard 505 for mounting platform components. The motherboard 505 is a point-to-point (P-P) interconnect platform that includes a processor 510, a processor 530 coupled via a P-P interconnects/interfaces as an Ultra Path Interconnect (UPI), and a device 519. In other embodiments, the system 500 may be of another bus architecture, such as a multi-drop bus. Furthermore, each of processors 510 and 530 may be processor packages with multiple processor cores. As an example, processors 510 and 530 are shown to include processor core(s) 520 and 540, respectively. While the system 500 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 510 and the chipset 560. Some platforms may include additional components and some platforms may only include sockets to mount the processors and/or the chipset.

The processors 510 and 530 can be any of various commercially available processors, including without limitation an Intel® Celeron®, Core®, Core (2) Duo®, Itanium®, Pentium®, Xeon®, and XScale® processors; AMD® Athlon®, Duron®, and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 510, and 530.

The processor 510 includes an integrated memory controller (IMC) 514 and P-P interconnects/interfaces 518 and 552. Similarly, the processor 530 includes an IMC 534 and P-P interconnects/interfaces 538 and 554. The WIC's 514 and 534 couple the processors 510 and 530, respectively, to respective memories, a memory 512, and a memory 532. The memories 512 and 532 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 512 and 532 locally attach to the respective processors 510 and 530.

In addition to the processors 510 and 530, the system 500 may include a device 519. The device 519 may be connected to chipset 560 by means of P-P interconnects/interfaces 529 and 569. The device 519 may also be connected to a memory 539. In some embodiments, the device 519 may be connected to at least one of the processors 510 and 530. In other embodiments, the memories 512, 532, and 539 may couple with the processor 510 and 530, and the device 519 via a bus and shared memory hub.

System 500 includes chipset 560 coupled to processors 510 and 530. Furthermore, chipset 560 can be coupled to storage medium 503, for example, via an interface (I/F) 566. The I/F 566 may be, for example, a Peripheral Component Interconnect-enhanced (PCI-e). The processors 510, 530, and the device 519 may access the storage medium 503 through chipset 560.

Storage medium 503 may comprise any non-transitory computer-readable storage medium or machine-readable storage medium, such as an optical, magnetic, or semiconductor storage medium. In various embodiments, storage medium 503 may comprise an article of manufacture. In some embodiments, storage medium 503 may store computer-executable instructions, such as computer-executable instructions 502 to implement one or more of processes or operations described herein, (e.g., process XY00 of FIG. XY). The storage medium 503 may store computer-executable instructions for any equations depicted above. The storage medium 503 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writable or re-writable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 510 couples to a chipset 560 via P-P interconnects/interfaces 552 and 562 and the processor 530 couples to a chipset 560 via P-P interconnects/interfaces 554 and 564. Direct Media Interfaces (DMIs) may couple the P-P interconnects/interfaces 552 and 562 and the P-P interconnects/interfaces 554 and 564, respectively. The DMI may be a high-speed interconnect that facilitates, e.g., eight Giga Transfers per second (GT/s) such as DMI 3.0. In other embodiments, the processors 510 and 530 may interconnect via a bus.

The chipset 560 may comprise a controller hub such as a platform controller hub (PCH). The chipset 560 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 560 may comprise more than one controller hub such as a chipset with a memory controller hub, a graphics controller hub, and an input/output (I/O) controller hub.

In the present embodiment, the chipset 560 couples with a trusted platform module (TPM) 572 and the UEFI, BIOS, Flash component 574 via an interface (I/F) 570. The TPM 572 is a dedicated microcontroller designed to secure hardware by integrating cryptographic keys into devices. The UEFI, BIOS, Flash component 574 may provide pre-boot code.

Furthermore, chipset 560 includes the I/F 566 to couple chipset 560 with a high-performance graphics engine, graphics card 565. The graphics card 565 may implement one or more of processes or operations described herein, (e.g., operations of FIGS. 2-4), and may include components of FIG. 1 (e.g., the partitioner 104 of FIG. 1, the subtractor 106 of FIG. 1, the transform and quantizer 108 of FIG. 1, the coder 110 of FIG. 1, the decoder 130 of FIG. 1, the inverse transform and quantizer 112 of FIG. 1, the adder 114 of FIG. 1, the prediction unit 116 of FIG. 1, the control 121 of FIG. 1. In other embodiments, the system 500 may include a flexible display interface (FDI) between the processors 510 and 530 and the chipset 560. The FDI interconnects a graphics processor core in a processor with the chipset 560.

Various I/O devices 592 couple to the bus 581, along with a bus bridge 580 that couples the bus 581 to a second bus 591 and an I/F 568 that connects the bus 581 with the chipset 560. In one embodiment, the second bus 591 may be a low pin count (LPC) bus. Various devices may couple to the second bus 591 including, for example, a keyboard 582, a mouse 584, communication devices 586, a storage medium 501, and an audio I/O 590.

The artificial intelligence (AI) accelerator 567 may be circuitry arranged to perform computations related to AI. The AI accelerator 567 may be connected to storage medium 501 and chipset 560. The AI accelerator 567 may deliver the processing power and energy efficiency needed to enable abundant data computing. The AI accelerator 567 is a class of specialized hardware accelerators or computer systems designed to accelerate artificial intelligence and machine learning applications, including artificial neural networks and machine vision. The AI accelerator 567 may be applicable to algorithms for robotics, internet of things, other data-intensive and/or sensor-driven tasks.

Many of the I/O devices 592, communication devices 586, and the storage medium 501 may reside on the motherboard 505 while the keyboard 582 and the mouse 584 may be add-on peripherals. In other embodiments, some or all the I/O devices 592, communication devices 586, and the storage medium 501 are add-on peripherals and do not reside on the motherboard 505.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
   decoding a coding unit (CU) of a first encoded video frame to obtain first decoded data, the CU including a first transform unit (TU) and a second TU;
   after the decoding of the CU, but prior to decoding the first TU and the second TU, predicting, based on the first decoded data, that a first type of transform from a plurality of different types of transforms was used to generate first transform coefficients for the first TU and second transform coefficients for the second TU, the plurality of different types of transforms including Low Frequency Non-Separable Transform (LFNST) and Multi Transform Selection (MTS), and the first type of transform is one of LFNST or MTS;
   after the predicting, decoding the first TU to obtain the first transform coefficients;
   after the predicting, decoding the second TU to obtain the second transform coefficients;
   generating, based on the first type of transform and the first transform coefficients, first reconstructed pixel values of the first TU; and
   generating, based on the first type of transform and the second transform coefficients, second reconstructed pixel values of the second TU.

2. The method of claim 1, wherein the first type of transform is LFNST, and the predicting includes determining, based on the first decoded data, at least one of: a partitioning tree type is not a dual chroma tree, a first flag indicative of use of matrix intra prediction-based image coding is set to a value of true, or at least one of a first width of the LFNST or a first height of the LFNST is less than 16.

3. The method of claim 1, wherein the first type of transform is MTS, and the predicting includes determining, based on the first decoded data, at least one of: a partitioning tree type is a dual chroma tree, an intra sub partition split type is not set to a value of no split, a second flag indicative of use of a subblock transform is set to a value of true, or at least one of a width of the MTS or a height of the MTS is greater than 32.

4. The method of claim 1, wherein the CU is a first CU, and including:
  decoding a second CU, the second CU including a third TU and a fourth TU;
  decoding the third TU to obtain third transform coefficients;
  predicting, based on second decoded data associated with the decoding of the third TU but prior to decoding the fourth TU, that a second type of transform from the plurality of different types of transforms was used to generate the third transform coefficients for the third TU; and
  generating, based on the second type of transform and the third transform coefficients, third reconstructed pixel values of the third TU.

5. The method of claim 4, wherein the predicting that the second type of transform was used to generate the third transform coefficients for the third TU includes:
  determining, based on the decoding of the second CU but prior to decoding the third TU, at least one of: at least one of a first width or a first height of the second type of transform is smaller than four or greater than a threshold value, a third flag indicative of a presence of an LFNST index is set to a value of false, or an inter-prediction encoding mode was used; and
  predicting the second type of transform is not LFNST.

6. The method of claim 4, wherein the first type of transform is LFNST, and the predicting that the second type of transform was used to generate the third transform coefficients for the third TU includes determining at least one of: an intra prediction encoding mode is used, a size of the second CU is less than or equal to 64 by 64, the second CU includes less than or equal to six TUS, a value of a fourth flag is equal to one, or a value of a fifth flag indicating that the second type of transform is LFNST is equal to zero.

7. The method of claim 4, wherein the first type of transform is MTS, and the predicting that the second type of transform was used to generate the third transform coefficients for the third TU includes determining at least one of: an intra prediction encoding mode is used, a size of the second CU is less than or equal to 32 by 32, the second CU includes less than or equal to three TUs, or the third TU and fourth TU both include less than 16 by 16 transform coefficients.

8. The method of claim 4, including:
  decoding a third CU, the third CU including a fifth TU and a sixth TU;
  decoding the fifth TU to obtain fourth transform coefficients;
  decoding the sixth TU to obtain fifth transform coefficients;
  determining, based on decoding syntax of encoded video data including the third CU, and after decoding all TUs of the third CU, that a third type of transform from the plurality of different types of transforms was used to generate the fourth transform coefficients and the fifth transform coefficients;
  generating, based on the third type of transform and the fourth transform coefficients, fourth reconstructed pixel values of the fifth TU; and
  generating, based on the third type of transform and the fifth transform coefficients, fifth reconstructed pixel values for the sixth TU.

9. A system comprising:
  interface circuitry;
  computer-executable instructions; and
  at least one programmable circuit to be programmed based on the computer-executable instructions to:
    decode a coding unit (CU) of a first encoded video frame to obtain first decoded data, the CU including a first transform unit (TU) and a second TU;
    after the CU is decoded, but prior to the first TU and the second TU being decoded, predict, based on the first decoded data, that a first type of transform from a plurality of different types of transforms was used to generate first transform coefficients for the first TU and second transform coefficients for the second TU, the plurality of different types of transforms including Low Frequency Non-Separable Transform (LFNST) and Multi Transform Selection (MTS), and the first type of transform is one of the LFNST or the MTS;
    decode the first TU to obtain the first transform coefficients;
    decode the second TU to obtain the second transform coefficients;
    generate, based on the first type of transform and the first transform coefficients, first reconstructed pixel values of the first TU; and
    generate, based on the first type of transform and the second transform coefficients, second reconstructed pixel values of the second TU.

10. The system of claim 9, wherein the first type of transform is LFNST, and to predict that the first type of transform was used to generate the first transform coefficients and the second transform coefficients, one or more of the at least one programmable circuit is to determine, based on the first decoded data, at least one of: a partitioning tree type is not a dual chroma tree, a first flag indicative of use of matrix intra prediction-based image coding is set to a value of true, or at least one of a first width of the LFNST or a first height of the LFNST is less than 16.

11. The system of claim 9, wherein the first type of transform is MTS, and to predict that the first type of transform was used to generate the first transform coefficients and the second transform coefficients, one or more of the at least one programmable circuit is to determine, based on the first decoded data, at least one of: a partitioning tree type is a dual chroma tree, an intra sub partition split type is not set to a value of no split, a second flag indicative of use of a subblock transform is set to a value of true, or at least one of a width of the MTS or a height of the MTS is greater than 32.

12. The system of claim 9, wherein the CU is a first CU, and one or more of the at least one programmable circuit is to:
  decode a second CU, the second CU including a third TU and a fourth TU;
  decode the third TU to obtain third transform coefficients;
  predict, based on second decoded data associated with decoding the third TU but prior to the fourth TU being decoded, that a second type of transform from the plurality of different types of transforms was used to generate the third transform coefficients for the third TU; and
  generate, based on the second type of transform and the third transform coefficients, third reconstructed pixel values of the third TU.

13. The system of claim 12, wherein one or more of the at least one programmable circuit is to:
  determine, based on data associated with decoding the second CU but prior to the third TU being decoded, at least one of: at least one of a first width or a first height of the second type of transform is smaller than four or greater than a threshold value, a third flag indicative of a presence of an LFNST index is set to a value of false, or an inter-prediction encoding mode was used; and
  predict that the second type of transform is not LFNST.

14. The system of claim 12, wherein the first type of transform is LFNST, and to predict that the second type of transform was used to generate the third transform coefficients for the third TU, one or more of the at least one programmable circuit is to determine at least one of: an intra prediction encoding mode is used, a size of the second CU is less than or equal to 64 by 64, the second CU includes less than or equal to six TUs, a value of a fourth flag is equal to one, or a value of a fifth flag indicating that the second type of transform is LFNST is equal to zero.

15. The system of claim 12, wherein the first type of transform is MTS, and to predict that the second type of transform was used to generate the third transform coefficients for the third TU, one or more of the at least one programmable circuit is to determine at least one of: an intra prediction encoding mode is used, a size of the second CU is less than or equal to 32 by 32, the second CU includes less than or equal to three TUs, or the third TU and fourth TU both include less than 16 by 16 transform coefficients.

16. The system of claim 12, wherein one or more of the at least one programmable circuit is to:
  decode a third CU, the third CU including a fifth TU and a sixth TU;
  decode the fifth TU to obtain fourth transform coefficients;
  decode the sixth TU to obtain fifth transform coefficients;
  determine, based on decoding syntax of encoded video data including the third CU, and after decoding all TUs of the third CU, that a third type of transform from the plurality of different types of transforms was used to generate the fourth transform coefficients and the fifth transform coefficients;
  generate, based on the third type of transform and the fourth transform coefficients, fourth reconstructed pixel values of the fifth TU; and
  generate, based on the third type of transform and the fifth transform coefficients, fifth reconstructed pixel values for the sixth TU.

17. A non-transitory computer-readable medium comprising computer-executable instructions to cause at least one programmable circuit to at least:
  decode a coding unit (CU) of a first encoded video frame to obtain first decoded data, the CU including a first transform unit (TU) and a second TU;
  after the CU is decoded, but prior to the first TU and the second TU being decoded, predict, based on the first decoded data, that a first type of transform from a plurality of different types of transforms was used to generate first transform coefficients for the first TU and second transform coefficients for the second TU, the plurality of different types of transforms including Low Frequency Non-Separable Transform (LFNST) and Multi Transform Selection (MTS), and the first type of transform is one of the LFNST or the MTS;
  decode the first TU to obtain the first transform coefficients;
  decode the second TU to obtain the second transform coefficients;
  generate, based on the first type of transform and the first transform coefficients, first reconstructed pixel values of the first TU; and
  generate, based on the first type of transform and the second transform coefficients, second reconstructed pixel values of the second TU.

18. The non-transitory computer-readable medium of claim 17, wherein the first type of transform is LFNST, and to predict that the first type of transform was used to generate the first transform coefficients and the second transform coefficients, the computer-executable instructions are to cause one or more of the at least one programmable circuit to determine, based on the first decoded data, at least one of: a partitioning tree type is not a dual chroma tree, a first flag indicative of use of matrix intra prediction-based image coding is set to a value of true, or at least one of a first width of the LFNST or a first height of the LFNST is less than 16.

19. The non-transitory computer-readable medium of claim 17, wherein the first type of transform is MTS, and to predict that the first type of transform was used to generate the first transform coefficients and the second transform coefficients, the computer-executable instructions are to cause one or more of the at least one programmable circuit to determine, based on the first decoded data, at least one of: a partitioning tree type is a dual chroma tree, an intra sub partition split type is not set to a value of no split, a second flag indicative of use of a subblock transform is set to a value of true, or at least one of a width of the MTS or a height of the MTS is greater than 32.

20. The non-transitory computer-readable medium of claim 17, wherein the CU is a first CU, and the computer-executable instructions are to cause one or more of the at least one programmable circuit to:
  decode a second CU, the second CU including a third TU and a fourth TU;
  decode the third TU to obtain third transform coefficients;
  predict, based on second decoded data associated with decoding the third TU but prior to the fourth TU being decoded, that a second type of transform from the plurality of different types of transforms was used to generate the third transform coefficients for the third TU; and
  generate, based on the second type of transform and the third transform coefficients, third reconstructed pixel values of the third TU.

* * * * *